United States Patent
Goetz et al.

(10) Patent No.: US 9,465,627 B2
(45) Date of Patent: Oct. 11, 2016

(54) BINDING-BASED CHARACTERIZATION OF CLOSURES IN SOFTWARE PROGRAMS

(75) Inventors: Brian Goetz, Williston, VT (US); Alexander R. Buckley, Cupertino, CA (US)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 1062 days.

(21) Appl. No.: 13/028,111

(22) Filed: Feb. 15, 2011

(65) Prior Publication Data

US 2012/0210308 A1   Aug. 16, 2012

(51) Int. Cl.
*G06F 9/45* (2006.01)
*G06F 9/44* (2006.01)

(52) U.S. Cl.
CPC .............. *G06F 9/4425* (2013.01); *G06F 8/45* (2013.01)

(58) Field of Classification Search
CPC .......... G06F 8/41; G06F 8/447; G06F 8/443; G06F 9/45516
USPC ................................................ 717/140, 149
See application file for complete search history.

(56) References Cited

U.S. PATENT DOCUMENTS

| 6,119,145 A * | 9/2000 | Ikeda et al. ................... 709/203 |
| 2009/0265688 A1* | 10/2009 | Govereau et al. ............ 717/124 |
| 2010/0191930 A1* | 7/2010 | Groff et al. .................... 711/170 |

OTHER PUBLICATIONS

Costan et al., "The Trusted Execution Module: Commodity General-Purpose Trusted Computing", 2008, G. Grimaud and F.-X. Standaert (Eds.): CARDIS 2008, LNCS 5189, 16 pages (pp. 133-148).*
Axelsen et al., "Groovy Package Templates: Supporting Reuse and Runtime Adaption of Class Hierarchies", Oct. 26, 2009, ACM 2009 Article, vol. 44 Issue 12, Dec. 2009, pp. 15-26.*
Alan Skorkin, "Closure—A Simple Explanation (Using Ruby)", May 18, 2010, http://www.skorks.com/2010/05/closures-a-simple-explanation-using-ruby/, 7 pages.*

* cited by examiner

*Primary Examiner* — Hang Pan
*Assistant Examiner* — Hui-Wen Lin
(74) *Attorney, Agent, or Firm* — Park, Vaughan, Fleming & Dowler LLP; Chia-Hsin Suen

(57) ABSTRACT

The disclosed embodiments provide a system that facilitates the compilation and execution of a software program. During operation, the system obtains a closure from source code for the software program. Next, the system characterizes a type of the closure based on a mutability of one or more variables captured by the closure. Finally, the system encodes the type into a compiled form of the closure to facilitate subsequent execution of the closure in a multi-threaded environment.

14 Claims, 4 Drawing Sheets

BINDING-BASED CHARACTERIZATION OF CLOSURES IN SOFTWARE PROGRAMS

RELATED APPLICATION

The subject matter of this application is related to the subject matter in a co-pending non-provisional application by the same inventors as the instant application and filed on the same day as the instant application, entitled "Preventing Unsafe Sharing Through Confinement of Mutable Captured Variables," having Ser. No. 13/028,104, and filed on 15 Feb. 2011.

BACKGROUND

1. Field

The disclosed embodiments relate to closure mechanisms in programming languages. More specifically, the present embodiments relate to techniques for characterizing closures based on the mutability of variables captured by the closures.

2. Related Art

Some programming languages allow for the capture of variables within the lexical scope of closures, as well as the mutation of those variables at deeper points in the call chain and/or by different threads. However, mutation of captured variables may lead to race conditions and/or atomicity failures if the corresponding closures are executed concurrently (e.g., in multiple threads, processors, and/or processor cores).

Hence, what is needed is a mechanism for avoiding unsafe sharing of mutable captured variables in multithreaded environments.

SUMMARY

The disclosed embodiments provide a system that facilitates the compilation and execution of a software program. During operation, the system obtains a closure from source code for the software program. Next, the system characterizes a type of the closure based on a mutability of one or more variables captured by the closure. Finally, the system encodes the type into a compiled form of the closure to facilitate subsequent execution of the closure in a multithreaded environment.

In some embodiments, the closure is characterized as a first type if the closure does not capture any variables and as a second type if the closure captures only immutable variables.

In some embodiments, the first type and the second type permit safe concurrent execution of the closure in the multithreaded environment.

In some embodiments, the closure is characterized as a third type if the closure captures one or more mutable variables.

In some embodiments, the third type is used to prevent unsafe execution of the closure in the multithreaded environment.

In some embodiments, unsafe execution of the closure is prevented by restricting execution of the closure within a runtime context.

In some embodiments, encoding the type into the compiled form of the closure involves compiling the closure into a method, and referencing the method from an object representing the type.

In some embodiments, the object represents the type by implementing an interface corresponding to the type or implementing a class corresponding to the type.

BRIEF DESCRIPTION OF THE FIGURES

In the figures, like reference numerals refer to the same figure elements.

DETAILED DESCRIPTION

Figure 1:
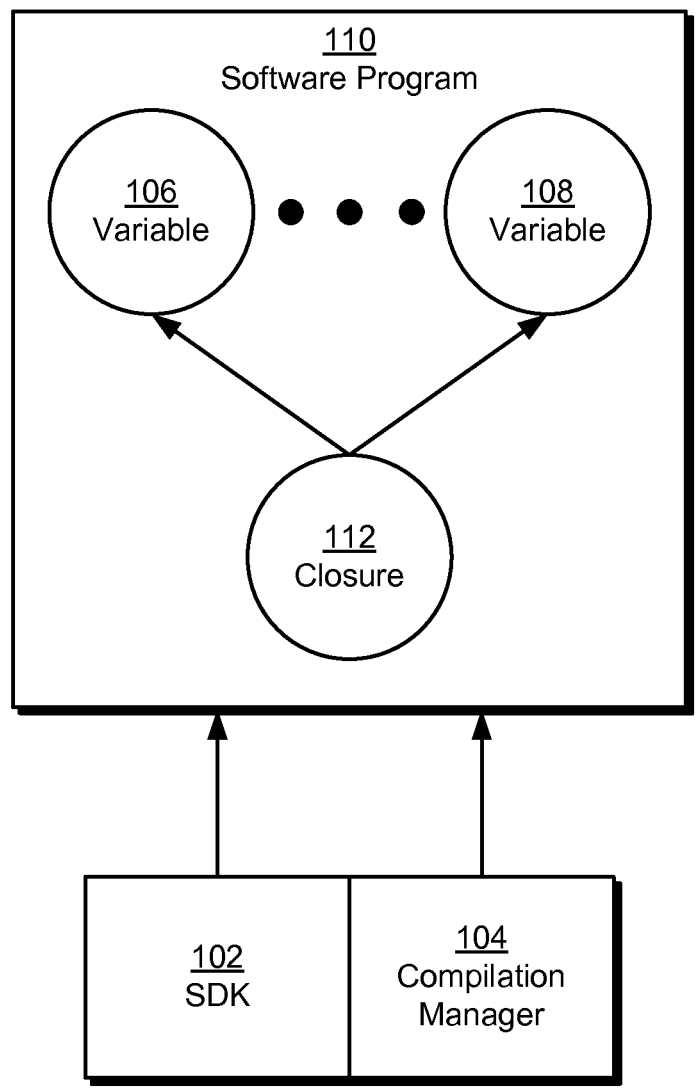
FIG. 1 shows a schematic of a system in accordance with an embodiment.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Embodiments provide a method and system for facilitating the compilation and execution of a software program. More specifically, embodiments provide a mechanism for characterizing closures in the software program based on the mutability of variables captured by the closures. A closure may be characterized as a first type if the closure does not capture any variables and as a second type if the closure captures only immutable variables. The first type and the second type may permit safe concurrent execution of the closure in the multithreaded environment. On the other hand, the closure may be characterized as a third type if the closure captures one or more mutable variables. To prevent unsafe execution of the third type of closure, execution of the closure may be restricted to a specific runtime context such as a thread, processor, and/or processor core.

In addition, the closure's type may be encoded into a compiled form of the closure to facilitate subsequent execution of the closure in a multithreaded environment. For example, the type may be encoded by compiling the closure into a method and referencing the method from an object representing the type. The object may represent the type by implementing an interface corresponding to the type and/or implementing a class corresponding to the type.

FIG. 1 shows a schematic of a system in accordance with an embodiment. As shown in FIG. 1, a software development kit (SDK) 102 and a compilation manager 104 may be used to manage the development and compilation of a software program 110. For example, SDK 102 and/or compilation manager 104 may form a part of the Java (Java™ is a registered trademark of Oracle America, Inc.) Development Kit (JDK).

Software program 110 may correspond to a standalone application, operating system, enterprise application, database, library, device driver, and/or other type of software. In addition, software program 110 may be executed in a variety of environments. For example, software program 110 may be executed on a single desktop computer or workstation, or software program 110 may be distributed across multiple servers within a data center. Along the same lines, software program 110 may be executed sequentially or in parallel on one or more processors and/or processor cores.

In one or more embodiments, SDK 102 supports the creation of a closure 112 that captures variables 106-108 (e.g., free variables) using source code for software program 110. For example, the following source code may calculate a sum from values in a list of elements:

```
int total = 0;
list.forEach({Foo x => total += x.foo( ); });
System.out.println(total);
```

Within the example, the "total" variable is captured (e.g., closed over) by the closure in the second line, which computes the sum by iterating over the elements and adding their "foo" values to "total" within a "forEach" method.

Those skilled in the art will appreciate that concurrent execution of a closure that captures a mutable variable may result in data races and/or atomicity failures. Continuing with the above example, the "forEach" method may correspond to a library abstraction that uses one thread to sequentially apply the closure to each element in the list. Alternatively, the "forEach" method may apply the closure to multiple elements in parallel using multiple threads, processors, and/or processor cores, thus causing data races on the "total" variable if access to the variable by the thread is not protected by mutual exclusion. In other words, the "forEach" method may behave non-deterministically and/or execute in a way that results in an incorrect value for the "total" variable compared to sequentially applying the closure to each element in the list.

In one or more embodiments, SDK 102 and compilation manager 104 include functionality to characterize closure 112 based on variables 106-108 captured by closure 112. More specifically, closure 112 may be characterized as a first type if the closure does not capture any variables, as a second type if the closure captures only immutable variables, and as a third type if the closure captures one or more mutable variables.

SDK 102 and/or compilation manager 104 may then encode the type into a compiled form of the closure to facilitate subsequent execution of the closure in a multithreaded environment. For example, the first and second types may permit safe concurrent execution of closure 112 in the multithreaded environment, while the third type may prevent unsafe execution of the closure by restricting execution of the closure within a runtime context (e.g., thread, processor, processor core). Use of binding-based characterizations of closures to facilitate execution in a multithreaded environment is discussed in further detail below with respect to FIG. 2.

Figure 2:
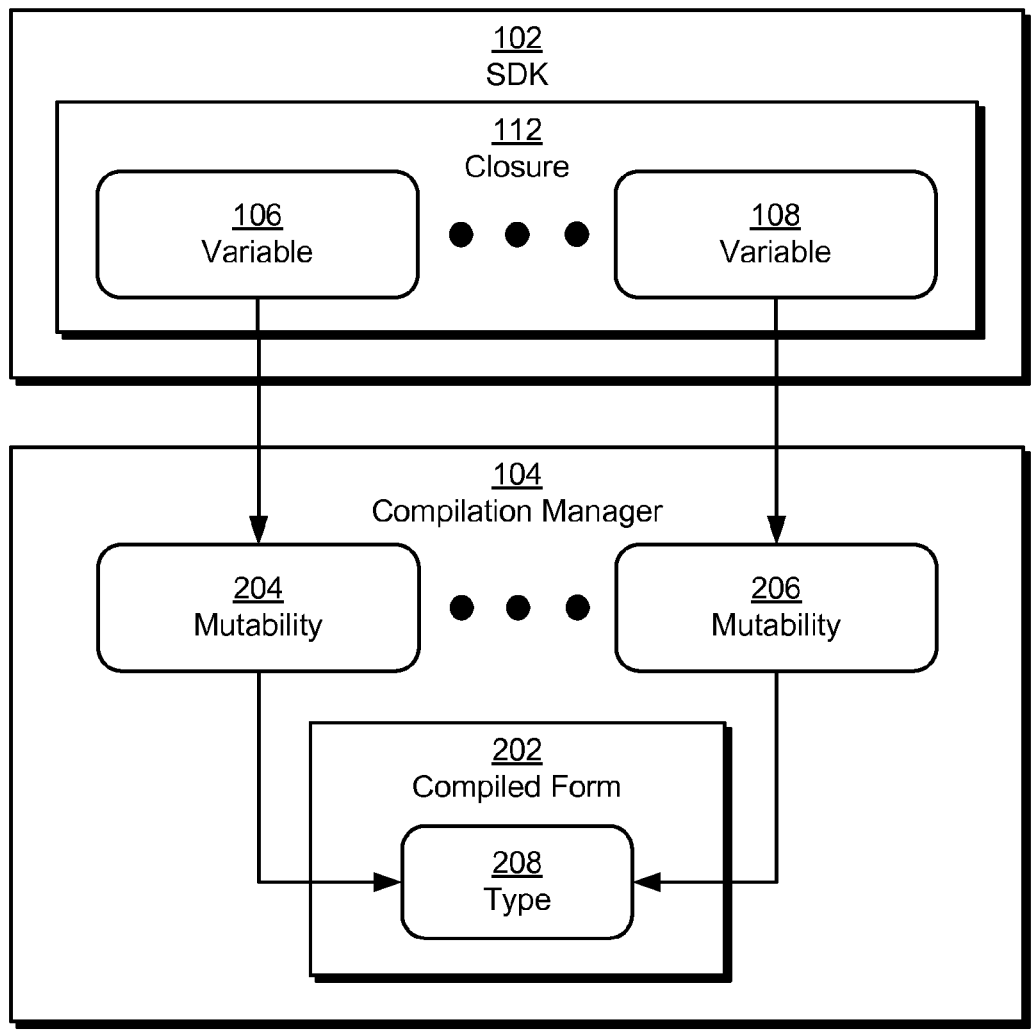
FIG. 2 shows the characterization of a closure in accordance with an embodiment.

FIG. 2 shows the characterization of closure 112 in accordance with an embodiment. As mentioned above, SDK 102 and/or compilation manager 104 may characterize a type 208 of closure 112 based on a mutability 204-206 (e.g., "mutable" or "immutable") of one or more variables 106-108 captured by closure 112.

In one or more embodiments, the mutability 204-206 of each variable 106-108 captured by closure 112 is determined by examining the variable's declaration within source code for the software program. For example, a Java variable may be mutable unless the variable is declared using the "final" keyword. Closure 112 may then be characterized as one of three types based on the highest level of mutability of any variable (e.g., variables 106-108) captured by closure 112, as discussed below.

First, closure 112 may be characterized as a first type if closure 112 does not capture any variables. For example, the following source code may contain a closure of the first type:

```
class A {
    public void foo( ) {
        List<String> list = ... ;
        list.forEach({String s => System.out.println(s); });
    }
}
```

Within the example, the exemplary closure of the first type iterates over a list of "String" elements and prints the elements' values within a "forEach" method.

Next, closure 112 may be characterized as a second type if closure 112 captures only immutable variables. For example, the following source code may contain a closure of the second type:

```
class B {
    public void foo( ) {
        List<Person> list = ... ;
        final int bottom = ..., top = ...;
        List inRange = list.filter({Person p =>
            p.size >= bottom && p.size <= top });
    }
}
```

In particular, the exemplary closure of the second type captures two immutable (e.g., "final") variables "bottom" and "top" and uses the values of the immutable variables and a "filter" method to filter a list of elements.

Finally, closure 112 may be characterized as a third type if the closure captures one or more mutable variables. For example, the following source code may contain a closure of the third type:

```
class C {
    public void foo ( ) {
        final int n = 3;
        int total = 0;
        List<Foo> list = ... ;
        list.forEach({Foo x => total += x.foo( ) * n; });
        System.out.println(total);
    }
}
```

The closure in the exemplary source code above may capture both the immutable variable "n" and the mutable variable "total" by multiplying "n" with the "foo" value of each element in a list and adding the product to "total" within a "forEach" method.

Compilation manager 104 may then encode type 208 into a compiled form 202 of closure 112 to facilitate subsequent execution of the closure in a multithreaded environment. Continuing with the examples above, the source code for the exemplary closure of the first type may be compiled into the following:

```
class A {
    private static Block<T> $sam$1 =
        (Block<T>) A#closure$1.asInstanceOf(Block.class,
            Type1Lambda.class);
    private static void closure$1(String s) {
        System.out.println(s);
    }
    public void foo( ) {
        List<String> list = ...
        list.forEach( $sam$1 );
    }
}
```

In particular, the body of the closure may be compiled into a static method named "closure$1" in class "A." A method reference "A#closure$1" may be used to inject the closure object with a type indicating the closure's type (e.g., "Type1Lambda"). The method reference may then be passed to the "forEach" method using the identifier "$ sam$1."

Similarly, the source code for the exemplary closure of the second type may be compiled into the following:

```
class B {
    class IIFrame {
        public final int i0, i1;
        public IIFrame (int i0, int i1) {
            this.i0 = i0;
            this.i1 = i1;
        }
    }
    private static boolean closure$1(IIFrame frame,
                    Person p) {
        return p.size >= frame.i0 && p.size <= frame.i1;
    }
    public void foo( ) {
        List<Person> list = ... ;
        final int bottom = ..., top = ...;
        Filter<Person> filter = (Filter<Person>)
            B#closure$1.bindTo(new IIFrame(bottom, top))
                .asInstanceOf(Filter.class, Type2Lambda.class);
        List inRange = list.filter(filter);
    }
}
```

Within the compiled code, the immutable "bottom" and "top" variables may be stored in a Frame object (e.g., stack frame, activation record, etc.) on the heap, and the body of the closure may be compiled into a static method named "closure$1" in class "B." A method reference "B#closure$1" may be used to obtain an object representing the closure that is initialized with the Frame object and then passed to the "filter" method. Moreover, the same method reference is used to inject the closure's type (e.g., "Type2Lambda") into the closure object for processing by the "filter" method.

Finally, the source code for the exemplary closure of the third type may be compiled into the following:

```
class C {
    class IxIFrame {
        public int i0;
        public final int i1;
        public IxIFrame (int i0, int i1) {
            this.i0 = i0;
            this.i1 = i1;
        }
    }
    private static void closure$1(IxIFrame frame,
                    Foo s) {
        frame.i0 += s.length( ) * frame.i1;
    }
    public void foo( ) {
        List<Foo> list = ...
        Frame f = new IFrame(0, 3);
        Block<Foo> block = (Block<Foo>)
            C#closure$1.bindTo(f)
                .asInstanceOf(Block.class, Type3Lambda.class);
        list.forEach(block);
        System.out.println(f.i0);
    }
}
```

As with the exemplary closures of the first and second types, the exemplary closure of the third type is compiled into a static method named "closure $1" in class "C." Both the mutable variable "total" and the immutable variable "n" are hoisted into a Frame object that is then "bound" as the first argument to the "closure" method. At the same time, an interface corresponding to the closure's type (e.g., "Type3Lambda") is injected into the closure object.

Because compiled forms of the exemplary closures above are injected with marker classes and/or interfaces representing the closure's respective types, normal introspection may be applied to detect the type of marker class or interface implemented by each closure object. For example, a "forEach" method may use the marker classes and/or interfaces to execute different types of closures in different ways:

```
public void forEach(Block lambda) {
    if (lambda instanceof Type3Lambda) {
        //serial implementation
    }
    else {
        //parallel implementation
    }
}
```

In particular, concurrent execution of a closure may be enabled in the multithreaded environment if the closure is of the first or second type because neither type will result in the unsafe sharing of captured variables. On the other hand, concurrent execution of a closure of the third type may result in data races and/or atomicity failures. As a result, the third type may be used to prevent unsafe execution of the closure in the multithreaded environment.

In one or more embodiments, unsafe sharing of mutable variables (e.g., by closures of the third type) is prevented by restricting execution of closures capturing the mutable variables to specific runtime contexts such as threads, processors, and/or processor cores. Restriction of closures to runtime contexts to prevent incorrect execution of software programs is discussed in a co-pending non-provisional application by the same inventors as the instant application and filed on the same day as the instant application, entitled "Preventing Unsafe Sharing of Mutable Captured Variables by Closures," having Ser. No. 13/028,104, and filing date Feb. 15, 2011, which is incorporated herein by reference.

Those skilled in the art will appreciate that SDK 102 and/or compilation manager 104 may utilize a variety of techniques to encode a closure's type into a compiled and/or executable form of the closure. For example, an object referencing a closure's method may represent the closure's type using a class, interface, trait, and/or other mechanism for defining the object. On the other hand, a closure's type may be encoded into the class name of a class containing the closure body (e.g., "Closure_Type1") and/or into a formal parameter of the method containing the closure's body. Finally, a closure's type may be dynamically injected into the corresponding object at runtime (e.g., by a runtime system) rather than at compile-time (e.g., by compilation manager 104). Consequently, SDK 102 and/or compilation manager 104 may utilize various language-based mechanisms to characterize closure 112 and encode type 208, thus facilitating the use of closure 112 in a variety of development, compilation, and/or execution environments.

Figure 3:
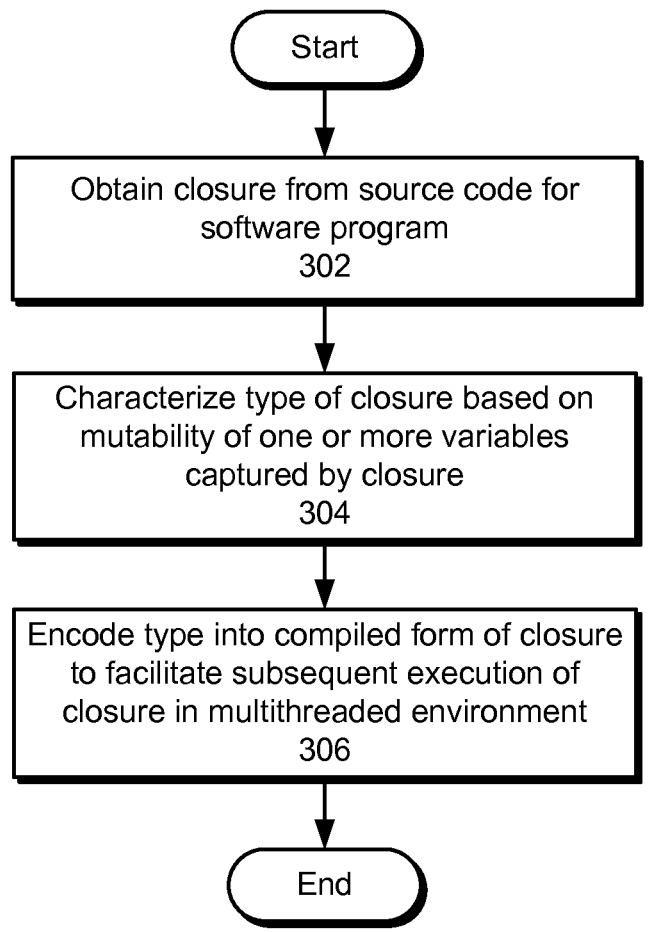
FIG. 3 shows a flowchart illustrating the process of facilitating the compilation and execution of a software program in accordance with an embodiment.

FIG. 3 shows a flowchart illustrating the process of facilitating the compilation and execution of a software program in accordance with an embodiment. In one or more embodiments, one or more of the steps may be omitted, repeated, and/or performed in a different order. Accordingly, the specific arrangement of steps shown in FIG. 3 should not be construed as limiting the scope of the embodiments.

First, a closure is obtained from source code for the software program (operation 302). For example, the closure may be obtained from Java source code for an enterprise application. Next, the type of the closure is characterized based on the mutability of one or more variables captured by the closure (operation 304). The closure may be characterized as a first type if the closure does not capture any variables, as a second type if the closure captures only immutable variables, and as a third type if the closure captures one or more mutable variables.

Finally, the type is encoded into a compiled form of the closure to facilitate subsequent execution of the closure in a multithreaded environment (operation 306). The type may be encoded into the compiled form of the closure by compiling the closure into a method and referencing the method from an object representing the type. In turn, the object may implement a class and/or interface corresponding to the type. For example, a marker class and/or interface representing the type may be injected into the object during compilation and/or execution of the closure.

Furthermore, subsequent execution of the closure in the multithreaded environment may be facilitated by allowing concurrent execution of the closure when possible and restricting execution of the closure to a runtime context when concurrent execution of the closure may result in unsafe sharing of variables captured by the closure. For example, concurrent execution of the closure may be enabled if the closure is of the first or second type, while concurrent execution of the closure may be restricted if the closure is of the third type.

Figure 4:
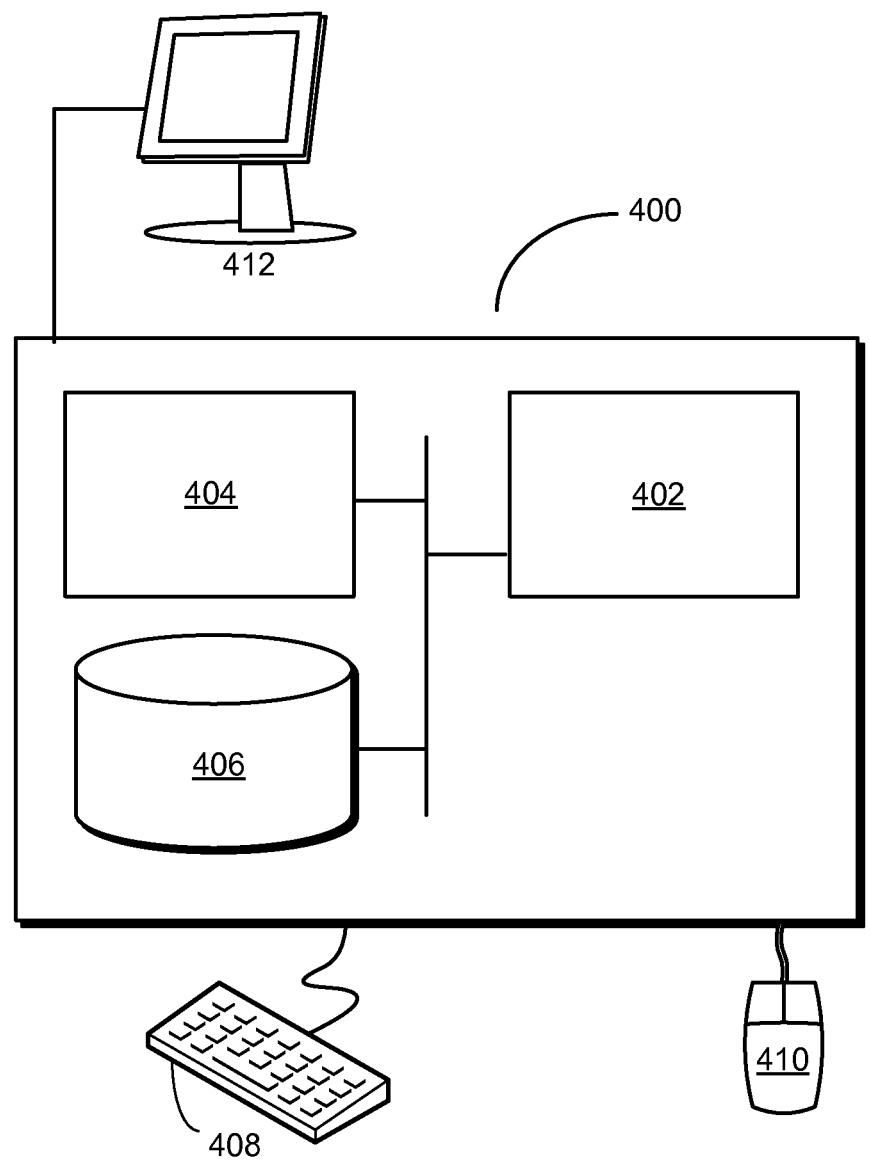
FIG. 4 shows a computer system in accordance with an embodiment.

FIG. 4 shows a computer system 400 in accordance with an embodiment. Computer system 400 includes a processor 402, memory 404, storage 406, and/or other components found in electronic computing devices. Processor 402 may support parallel processing and/or multi-threaded operation with other processors in computer system 400. Computer system 400 may also include input/output (I/O) devices such as a keyboard 408, a mouse 410, and a display 412.

Computer system 400 may include functionality to execute various components of the present embodiments. In particular, computer system 400 may include an operating system (not shown) that coordinates the use of hardware and software resources on computer system 400, as well as one or more applications that perform specialized tasks for the user. To perform tasks for the user, applications may obtain the use of hardware resources on computer system 400 from the operating system, as well as interact with the user through a hardware and/or software framework provided by the operating system.

In one or more embodiments, computer system 400 provides a system for facilitating the development and compilation of a software program. The system may include an SDK and a compilation manager. The SDK may enable the creation of a closure using source code for the software program. The compilation manager may then determine a type of the closure based on one or more variables captured by the closure and encode the type into a compiled form of the closure to facilitate subsequent execution of the closure in a multithreaded environment.

In addition, one or more components of computer system 400 may be remotely located and connected to the other components over a network. Portions of the present embodiments (e.g., SDK, compilation manager, etc.) may also be located on different nodes of a distributed system that implements the embodiments. For example, the present embodiments may be implemented using a cloud computing system that remotely manages the development, compilation, and execution of software programs.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method, comprising:
   detecting, by computer, a closure from source code for a software program;
   characterizing a type of the closure based on:
   whether the closure captures any variables; and
   if the closure captures one or more variables, a mutability of the one or more variables captured by the closure;
   based on the characterization of the type, selecting, from a plurality of markers, a marker to encode the type into a compiled form of the closure, wherein the marker is one of an interface that corresponds to the type, a class that corresponds to the type, and a trait that corresponds to the type; and
   while executing a compiled form of the source code in a multithreaded environment, preventing an unsafe concurrent execution of the compiled form of the closure when the selected marker indicates that the closure captures at least one mutable variable;
   wherein the closure is characterized as a first type if the closure does not capture any variables;
   wherein the closure is characterized as a second type if the closure captures only immutable variables, wherein the first type and the second type permit safe concurrent execution of the closure in the multithreaded environment; and wherein the closure is characterized as a third type if the closure captures one or more mutable variables.

2. The method of claim 1, wherein the third type is used to prevent unsafe execution of the closure in the multithreaded environment.

3. The method of claim 2, wherein unsafe execution of the closure is prevented by restricting execution of the closure within a runtime context.

4. The method of claim 1, wherein encoding the type into the compiled form of the closure comprises:
compiling a body of the closure into a static method; and
referencing the static method from a closure object that represents the closure.

5. The method of claim 4, wherein:
the marker is one of a marker interface that corresponds to the type and a marker class that corresponds to the type;
the one of the marker interface and the marker class is associated with the object as the object is instantiated; and
the object implements the one of the marker interface and the marker class.

6. The method of claim 1:
wherein the marker is a marker interface;
wherein the closure is characterized as a first type and a first marker is selected to encode the first type into the compiled form of the closure if the closure does not capture any variables;
wherein the closure is characterized as a second type and a second marker is selected to encode the second type into the compiled form of the closure if the closure captures only immutable variables;
wherein encoding the type into the compiled form of the closure comprises:
compiling a body of the closure into a static method; and
instantiating a closure object that represents the closure by implementing the marker interface and referencing the static method; and
wherein the method further comprises, during subsequent execution of the closure object in the multithreaded environment:
determining, via introspection, the type of the closure that is represented by the closure object;
permitting safe concurrent execution of the closure object in the multithreaded environment if the introspection determines the type of the closure to be one of the first type and the second type.

7. A system, comprising:
a processor and a memory;
a software development kit (SDK) configured to enable creation of a closure using source code for a software program; and
a compilation manager, which is stored in the memory and is executed using the processor, configured to:
determine a type of the closure based on:
whether the closure captures any variables; and
if the closure captures one or more variables, a mutability of the one or more variables captured by the closure; and
based on the determination, select, from a plurality of markers, a marker to encode the type into a compiled form of the closure, wherein the marker is one of an interface that corresponds to the type, a class that corresponds to the type, and a trait that corresponds to the type;

wherein while executing a compiled form of the source code in a multithreaded environment, an unsafe concurrent execution of the compiled form of the closure is prevented when the selected marker indicates that the closure captures at least one mutable variable;
wherein the closure is characterized as a first type if the closure does not capture any variables;
wherein the closure is characterized as a second type if the closure captures only immutable variables, wherein the first type and the second type permit safe concurrent execution of the closure in the multithreaded environment; and
wherein the closure is characterized as a third type if the closure captures one or more mutable variables.

8. The system of claim 7, wherein the third type is used to prevent unsafe execution of the closure in the multithreaded environment.

9. The system of claim 7, wherein encoding the type into the compiled form of the closure comprises:
compiling a body of the closure into a static method; and
referencing the static method from a closure object that represents the closure.

10. The system of claim 9, wherein:
the marker is one of a marker interface that corresponds to the type and a marker class that corresponds to the type;
the one of the marker interface and the marker class is injected to the object while the object is instantiated; and
the object implements the one of the marker interface and the marker class.

11. A non-transitory computer-readable storage medium storing instructions that when executed by a computer cause the computer to perform a method, the method comprising:
detecting a closure from source code for a software program;
characterizing a type of the closure based on:
whether the closure captures any variables; and
if the closure captures one or more variables, a mutability of one or more variables captured by the closure;
based on the characterization of the type, selecting, from a plurality of markers, a marker to encode the type into a compiled form of the closure, wherein the marker is one of an interface that corresponds to the type, a class that corresponds to the type, and a trait that corresponds to the type; and
while executing a compiled form of the source code in a multithreaded environment, preventing an unsafe concurrent execution of the compiled form of the closure when the selected marker indicates that the closure captures at least one mutable variable;
wherein the closure is characterized as a first type if the closure does not capture any variables;
wherein the closure is characterized as a second type if the closure captures only immutable variables, wherein the first type and the second type permit safe concurrent execution of the closure in the multithreaded environment; and
wherein the closure is characterized as a third type if the closure captures one or more mutable variables.

12. The non-transitory computer-readable storage medium of claim 11, wherein the third type is used to prevent unsafe execution of the closure in the multithreaded environment.

13. The non-transitory computer-readable storage medium of claim 11, wherein encoding the type into the compiled form of the closure comprises:
  compiling a body of the closure into a static method; and
  referencing the static method from a closure object that represents the closure.

14. The non-transitory computer-readable storage medium of claim 13, wherein:
  the marker is one of a marker interface that corresponds to the type and a marker class that corresponds to the type;
  the one of the marker interface and the marker class is injected to the object while the object is instantiated; and
  the object implements the one of the marker interface and the marker class.

* * * * *

UNITED STATES PATENT AND TRADEMARK OFFICE
CERTIFICATE OF CORRECTION

PATENT NO. : 9,465,627 B2  
APPLICATION NO. : 13/028111  
DATED : October 11, 2016  
INVENTOR(S) : Goetz et al.

Page 1 of 1

It is certified that error appears in the above-identified patent and that said Letters Patent is hereby corrected as shown below:

In Column 5, Line 40, delete ""$ sam$1."" and insert -- "$sam$1." --, therefor.

Signed and Sealed this
Thirteenth Day of June, 2017

Joseph Matal
*Performing the Functions and Duties of the*
*Under Secretary of Commerce for Intellectual Property and*
*Director of the United States Patent and Trademark Office*